United States Patent [19]

Kumasaka et al.

[11] 3,737,400
[45] June 5, 1973

[54] SELF-EXTINGUISHABLE POLYURETHANE FOAM

[75] Inventors: Sadao Kumasaka, Suginami-ku, Tokyo; Satomi Suzuki, Nerima-ku, Tokyo; Takeo Yoshino, Edogawa-ku, Tokyo; Takashi Ibayashi, Kitatama-gun, Tokyo; Tutomu Kobayashi, Shinjuku-ku, Tokyo, all of Japan

[73] Assignee: Toyo Rubber Chemical Industrial Corp., Tokyo, Japan

[22] Filed: Mar. 24, 1972

[21] Appl. No.: 237,887

Related U.S. Application Data

[63] Continuation-in-part of Ser. No. 21,223, March 19, 1970.

[52] U.S. Cl...........260/2.5 AJ, 117/136, 260/2.5 AK
[51] Int. Cl. ..............................................C08g 22/44
[58] Field of Search....................260/2.5 AJ, 2.5 AK

[56] References Cited

UNITED STATES PATENTS

| | | | |
|---|---|---|---|
| 3,262,894 | 7/1966 | Green | 260/2.5 AJ |
| 3,134,742 | 5/1964 | Wismen et al. | 260/2.5 AJ |

*Primary Examiner*—Donald E. Czaja
*Assistant Examiner*—M. J. Welsh
*Attorney*—Solon B. Kemon, Carroll Palmer and William T. Estabrook et al.

[57] ABSTRACT

A self-extinguishable polyurethane foam loaded with a flame-suppressing agent. This agent is prepared of either one member selected from the group consisting of $(NH_4)_2SO_4$, $Al(OH)_3 \cdot nH_2O$ and a mixture thereof, or a combination of said one member with at least one member selected from the group consisting of KCl, $K_2SO_4$, $K_2O$, $KNO_3$, $Ca(OH)_2$, $Mg(OH)_2$ and $Ba(OH)_2$.

8 Claims, No Drawings

SELF-EXTINGUISHABLE POLYURETHANE FOAM

CROSS-REFERENCE TO RELATED APPLICATION

This is a continuation-in-part of the U.S. Pat. application Serial No. 21,223, filed Mar. 19, 1970 (now abandoned).

SUMMARY OF THE INVENTION

The present invention relates to a self-extinguishable polyurethane foam adapted to be used as a cushioning, heat insulating or sound absorbing material.

The object of the present invention is to provide an inexpensive polyurethane foam having a high degree of self-extinction as well as exhibiting excellent properties of matters for example, involving no appreciable lowering in compression strength, bending strength and impact resilient properties or rebound property.

A self-extinguishable polyurethane foam according to the present invention is prepared by applying a flame-suppressing agent, by optional methods, to a polyurethane foam prepared through reaction, with polyisocyanates, of polyols (polyhydroxy compound) such as polyether or polyester; the flame-suppressing agent necessarily including, in addition to the following compound (a) or (b), at least one member selected from the following compounds:

a. Ammonium sulfate;
b. Aluminum hydroxide hydrate;
c. KCl;
d. $K_2SO_4$;
e. $K_2O$;
f. $KNO_3$;
g. $Ca(OH)_2$;
h. $Mg(OH)_2$;
i. $Ba(OH)_2$.

As methods for applying the flame-suppressing agent to the polyurethane foam, the flame-suppressing agent may be added at an optional stage before the completion of a foaming reaction in which a polyurethane foam is produced. Or a flame-suppressing agent may be coated later onto the surface of a polyurethane foam obtained through the foaming reaction. For example, foaming may be effected, using a one-shot method or prepolymer method, by adding the suppressing agent to urethane material consisting primarily of polyol and polyisocyanate. Said flame-suppressing agent may be coated on the surface of a polyurethane in the form of a solution prepared by dissolving said agent in a suitable solvent, for example, water, followed by drying to fix it in place. Or it is possible to disperse said flame-suppressing agent in a suitable binder, for example, polychlorophene latex, or polyvinylidene chloride latex which has good adhesivity to said polyurethane foam and coat the resultant dispersion on said polyurethane foam for indirect attachment. Where the foam material to be used mainly consists of open cells there may be used a flame-suppressing agent in the powdered form. In such case, said powdered flame-suppressing agent can be distributed in said open cells by shaking a body of said foam material to be held in place, thereby displaying a desired flame-suppressing effect. The amount of the flame-suppressing agent to be added to the polyurethane foam, though somewhat different dependent upon the kind of foams, for example, soft, semi-hard or hard foam, is preferably within the range of about 30—30C parts based on 100 parts of polyol. Particularly in cases where use is made of soft polyurethane foam, the added amount of flame-suppressing agent is desirably more than about 50 parts by weight due to the greater flammability of the polymer per se. Generally, the degree of self extinction will be increased in proportion to the amount of the suppressing agent. However, the properties of matter such as impact resilient property tends to be decreased in inverse proportion. In the flame-suppressing agent used in this invention, the degree of self-extinguishable property is increased in proportion to its increased amount to the polyurethane, while no appreciable lowering in the properties of matter will result. According to the present invention, even if the amount of flame-suppressing agent is increased up to about 300 parts it is still possible to retain the properties of matter, such as impact resilient property, to the extent required from the practical view point. In other words, it is possible in the present invention to retain in the polymer as much as 300 parts of the flame-suppressing agent, and the self-extnguishable property can be sufficiently enchanced accordingly. Moreover, the flame-suppressing agent used in the present invention is relatively inexpensive. Particularly since ammonium sulfate is available, as nitrogeneous manure, at a lower price, it is possible to ;rovide inexpensive self-extinguishable polyurethane foam. Where the flame-suppressing agent is added to urethane material, it is preferred that the amount of catalyst be increased in proportion to the amount of the urethane material used. As a suppressing agent it is possible in the present invention to use, out of those shown in (a)–(i), the ammonium sulfate and crystal water-containing aluminum hydroxide either singly or in combination. However, no sufficient flame proofness is obtained when the remaining materials as shown in (c)–(i) are used either alone or in combination. In this case, if these materials as shown in (c)–(i) are used in combination with at least one of the aluminum sulfate and crystal water-containing aluminum hydroxide, then an excellent self-extinguishable property can be imparted to the polyurethane foam. It has been established that, particularly when the crystal water-containing aluminum hydroxide is added to the urethane material, a very good self-extinguishable property can be imparted to the urethane foam, as compared with the other crystal containing compounds, such as borax ($Na_2B_4O_7 \cdot 10H_2O$), not used in the present invention. This can be explained in the following way. For example, where borax is added as a flame-suppressing agent to the urethane material to synthesize a polyurethane foam, crystal water bonded to borax is liberated, due to a reaction heat generated during the foaming reaction, to function as a foaming agent with the result that, within a polyurethane foam formed through completion of the foaming reaction, there is no longer left any crystal water bonded to the borax. Any crystal water in the crystal water-containing aluminum hydroxide used in the present invention is not liberated from the aluminum hydroxide proper by a heat generated during the foaming reaction, and is left within a polyurethane foam formed. When this polyurethane foam is later subject to flame, the crystal water, together with the aluminum hydroxide proper, acts effectively as a flame-suppressing agent.

The present invention will be more fully understood from the following specific examples wherein all parts are by weight unless otherwise indicated.

EXAMPLE 1

A polyurethane foam was manufactured from the following composition using the conventional method.

| | |
|---|---|
| Trifunctional polyetherglycol (molecular weight 3000) | 100 parts |
| Triethylene diamine | 0.3 part |
| Stannous octoate | 0.15 part |
| Silicone oil | 1.2 parts |
| Trichlorodifluoromethane water ($H_2O$) | 2.0 parts |
| Tolylene diisocyanate (isomer ratio 2, 4/2, 6=80/20) | 41 parts |

From the polyurethane foamed mass a plurality of test blocks were cut off, to each of which was then added, based on 100 parts of the above polyetherglycol, ammonium sulfate in an amount corresponding to Table I as mentioned below. The additiona of a flame-suppressing agent to the test blocks was effected by impregnating the test block with a saturated aqueous solution of ammonium sulfate which was followed by drying. The block was then subject to a flammability test persuant to ASTM D-1692-59T. The results of the test are presented in Table I below.

TABLE I

| Test block | Ammonium sulfate (parts) | Burning length (m/m) | Burning time (sec.) | Rebound property (%) |
|---|---|---|---|---|
| 1 | 0 | — | — | 36 |
| 2 | 30 | 52 | 41 | 35 |
| 3 | 50 | 12.1 | 22 | 35 |
| 4 | 80 | 8.5 | 11 | 33 |
| 5 | 100 | 4.1 | 5 | 33 |
| 6 | 130 | 2.4 | 3.5 | 33 |
| 7 | 150 | 1.5 | 2 | 33 |
| 8 | 170 | 1.0 | 1.5 | 32 |
| 9 | 200 | 0 | 0 | 28 |
| 10 | 250 | 0 | 0 | 27 |
| 11 | 300 | 0 | 0 | 25 |

Substantially the same results were obtained from those test blocks prepared by the direct addition of ammonium sulfate to the above composition to effect foaming.

EXAMPLE 2

The same procedure as shown in Example 1 was conducted except that to the above urethane material composition ammonium sulfate and KCl were added, based on 100 parts of the above polyetherglycol, at the ratio of 3:1 in an amount ranging 0–300 parts. The resultant blocks were subject to the same test as shown in Example 1. The results of the test are presented in Table II below.

TABLE II

| Test block | $(NH_4)_2SO_4$ + KCl (parts) | Burning length (m/m) | Burning time (sec.) | Rebound property (%) |
|---|---|---|---|---|
| 1 | 0 | — | — | 36 |
| 2 | 30 | 42 | 39 | 35 |
| 3 | 50 | 22 | 21 | 35 |
| 4 | 80 | 7.1 | 8.5 | 33 |
| 5 | 100 | 3.2 | 4.1 | 33 |
| 6 | 130 | 2.5 | 2.0 | 31 |
| 7 | 150 | 1.0 | 1.0 | 30 |
| 8 | 200 | 0 | 0 | 27 |
| 9 | 250 | 0 | 0 | 25 |
| 10 | 300 | 0 | 0 | 24 |

EXAMPLE 3

| | |
|---|---|
| Trifunctional polyetherglycol (molecular weight 3000) | 85 parts |
| Trifunctional polyetherglycol (molecular weight 1000) | 15 parts |
| Triethylene diamine | 6.1 parts |
| n-ethylmorpholine | 0.4 part |
| Silicone oil | 1.5 parts |
| Water ($H_2O$) | 3.2 parts |
| Tolylene diisocyanate (isomer ratio 2, 4/2, 6=80/20) | 47 parts |

To the above urethane material composition a crystal water-containing aluminum hydroxide was added, in an amount ranging 0–300 parts, based on 100 parts of polyetherglycol. From the resultant foam a plurality of blocks were prepared, each of which was subject to a flammability test according to ASTM D-1692-59T. The results of the test are presented in Table III below.

TABLE III

| Test block | $Al(OH)_3 \cdot nH_2O$ (parts) | Burning length (m/m) | Burning time (sec.) | Rebound property (%) |
|---|---|---|---|---|
| 1 | 0 | — | — | 39 |
| 2 | 30 | 76 | 107 | 38 |
| 3 | 50 | 42 | 51 | 36 |
| 4 | 80 | 25 | 16 | 36 |
| 5 | 100 | 8.5 | 9.5 | 34 |
| 6 | 130 | 4.0 | 5.0 | 34 |
| 7 | 150 | 2.0 | 1.5 | 32 |
| 8 | 200 | 0 | 0 | 30 |
| 9 | 250 | 0 | 0 | 28 |
| 10 | 300 | 0 | 0 | 24 |

EXAMPLE 4

To the same urethane material composition as shown in Example 3, ammonium sulfate and a crystal water-containing aluminum hydroxide were added, based on 100 parts of polyol, at the rate of 3:2 in an amount ranging 0–300 parts to obtain a urethane foam. From this foam, test blocks were prepared, each of which was subject to a flammability test persuant to ASTM D-1692-59T. The results of the test are shown in Table IV below.

Table IV

| Test block | $(NH_4)_2SO_4$ + $Al(OH)_3 \cdot nH_2$) (parts) | Burning length (m/m) | Burning time (sec.) | Rebound property (%) |
|---|---|---|---|---|
| 1 | 0 | — | — | 39 |
| 2 | 30 | 56 | 48 | 38 |
| 3 | 50 | 31 | 29 | 36 |
| 4 | 100 | 4.0 | 3.8 | 33 |
| 5 | 150 | 1.5 | 1.0 | 30 |
| 6 | 200 | 0 | 0 | 28 |
| 7 | 250 | 0 | 0 | 26 |
| 8 | 300 | 0 | 0 | 24 |

EXAMPLE 5

| | |
|---|---|
| Octofunctional polyether (molecular weight 500, OH value 450) | 100 parts |
| Trichloromonofluoromethane | 45 parts |
| Triethylene diamine | 0.6 part |
| Silicone oil | 1.0 part |
| 4, 4'-diphenylmethane diisocyanate | 125 parts |

To the above composition, ammonium sulfate was added, based on 100 parts of polyether, in an amount ranging 0–200 parts to obtain a hard urethane foam. From this foam, test blocks were prepared, each of which was subject to a flammability test according to ASTM D-1692-59T. The results of the test are shown in Table V below.

TABLE V

| Test block | $(NH_4)_2SO_4$ (parts) | Burning length (m/m) | Burning time (sec.) | Compressive strength (Kg/cm$^2$) | Bending strength (Kg/cm$^2$) |
|---|---|---|---|---|---|
| 1 | 0 | 40 | 16 | 2.0 | 3.0 |
| 2 | 30 | 8 | 3 | 1.8 | 2.7 |
| 3 | 50 | 0 | 0 | 1.7 | 2.5 |
| 4 | 100 | 0 | 0 | 1.6 | 2.0 |
| 5 | 130 | 0 | 0 | 1.3 | 1.9 |
| 6 | 150 | 0 | 0 | 1.2 | 1.8 |
| 7 | 200 | 0 | 0 | 1.0 | 1.5 |

EXAMPLE 6

The same procedure as used in Example 5 was conducted except that use was made as a flame-suppressing agent of a crystal water containing-aluminum hydroxide in place of ammonium sulfate. The results of the test were substantially the same as in Example 5.

What we claim is:

1. A self-extinguishable polyurethane foam prepared by reaction between polyols and polyisocyanates comprising ammonium sulfate as a flame-suppressing agent.

2. A self-extinguishable polyurethane foam prepared by reaction between polyols and polyisocyanates comprising as a flame-suppressing agent a mixture of ammonium sulfate and aluminum hydroxide hydrate.

3. A self-extinguishable polyurethane foam prepared by reaction between polyols and polyisocyanates comprising as a flame-suppressing agent ammonium sulfate together with at least one member selected from the group consisting of KCl, $K_2O$, $KNO_3$, $Ca(OH)_2$, $Mg(OH)_2$, $K_2SO_4$ and $Ba(OH)_2$.

4. A self-extinguishable polyurethane foam prepared by reaction between polyols and polyisocyanates comprising as a flame-suppressing agent ammonium sulfate together with aluminum hydroxide hydrate and at least one member selected from the group consisting of KCl, $K_2O$, $KNO_3$, $Ca(OH)_2$, $Mg(OH)_2$, $K_2SO_4$, and $Ba(OH)_2$.

5. Self-extinguishable polyurethane foam according to claim 1 wherein the flame-suppressing agent is 30 to 300 parts by weight per 100 parts of said polyols.

6. Self-extinguishable polyurethane foam according to claim 2 wherein the flame-suppressing agent is 30 to 300 parts by weight per 100 parts of said polyols.

7. Self-extinguishable polyurethane foam according to claim 3 wherein the flame-suppressing agent is 30 to 300 parts by weight per 100 parts of said polyols.

8. Self-extinguishable polyurethane foam according to claim 4 wherein the flame-suppressing agent is 30 to 300 parts by weight per 100 parts of said polyols.

* * * * *